(12) United States Patent
Sofka (10) Patent No.: US 9,964,754 B2
(45) Date of Patent: May 8, 2018

(54) METHOD, APPARATUS, AND COMPUTER-READABLE MEDIUM FOR SWITCHING OPTICAL PATHS

(71) Applicant: Finger Lakes Instrumentation, LLC, Lima, NY (US)

(72) Inventor: Jozef Sofka, Binghamton, NY (US)

(73) Assignee: Finger Lakes Instrumentation, LLC, Lima, NY (US)

( * ) Notice: Subject to any disclaimer, the term of this patent is extended or adjusted under 35 U.S.C. 154(b) by 0 days. days.

(21) Appl. No.: 14/966,349

(22) Filed: Dec. 11, 2015

(65) Prior Publication Data

US 2017/0168289 A1 Jun. 15, 2017

(51) Int. Cl.
*G02B 26/08* (2006.01)
*G02B 21/16* (2006.01)

(52) U.S. Cl.
CPC ......... *G02B 26/0816* (2013.01); *G02B 21/16* (2013.01)

(58) Field of Classification Search
CPC .............. G02B 17/002; G02B 21/0048; G02B 26/0816; G02B 26/0833; G02B 26/105
USPC ...... 359/223.1, 225.1, 226.2, 388, 857, 861, 359/900
See application file for complete search history.

(56) References Cited

U.S. PATENT DOCUMENTS

| | | | |
|---|---|---|---|
| 5,687,262 A | 11/1997 | Buchin | |
| 2010/0073757 A1* | 3/2010 | Birk | G01J 3/02 359/291 |
| 2013/0094071 A1 | 4/2013 | Redford | |
| 2014/0226204 A1* | 8/2014 | Mitzkus | G02B 21/06 359/388 |
| 2014/0320958 A1* | 10/2014 | Cooper | G02B 17/023 359/388 |
| 2015/0015929 A1* | 1/2015 | Wilhelm | G02B 21/0088 359/226.1 |
| 2015/0323774 A1* | 11/2015 | Lippert | G02B 21/002 359/388 |
| 2016/0103309 A1* | 4/2016 | Suzuki | G02B 27/145 359/388 |

* cited by examiner

*Primary Examiner* — Frank Font
(74) *Attorney, Agent, or Firm* — Timothy W. Menasco, Esq.; Harter Secrest & Emery LLP (57) ABSTRACT

Presented is a method, apparatus, and computer-readable medium for selectively switching optical paths. The apparatus includes a directing mirror for redirecting light from an incoming path to one of a plurality of input paths and redirecting the light from one of a plurality of output paths to an outgoing path, and a plurality of input mirrors, each one of the plurality of input mirrors operable for redirecting the light from one of the plurality of input paths to one of a plurality of transition paths. The apparatus includes a plurality of light modifying elements, each one of the light modifying elements in a corresponding transition path and a plurality of output mirrors, each one of the plurality of output mirrors operable for redirecting the light from one of the plurality of transition paths to one of a plurality of output paths.

28 Claims, 9 Drawing Sheets

602: (a) redirecting, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light; and (b) redirecting, by the directing mirror, the light from one of the plurality of output paths to an outgoing path

604: wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

606: wherein the plurality of input mirrors, the plurality of light modifying elements, and the plurality of output mirrors are fixed relative to each other

608: wherein the plurality of input mirrors, the plurality of light modifying elements, and the plurality of output mirrors are moveably affixed relative to each other

610: wherein the light redirected by the directing mirror from the incoming path to the one of the plurality of input paths is coincident with the light redirected by the directing mirror from the one of the plurality of output paths to the outgoing path

612: wherein the light redirected by the directing mirror from the incoming path to the one of the plurality of input paths is partially coincident with the light redirected by the directing mirror from the one of the plurality of output paths to the outgoing path

614: wherein the light redirected by the directing mirror from the incoming path to the one of the plurality of input paths is spaced from the light redirected by the directing mirror from the one of the plurality of output paths to the outgoing path

616: wherein the plurality of light modifying elements are at least one of an optical filter, lens, polarization filter, spatial filter, aperture, slot, and color filter

METHOD, APPARATUS, AND COMPUTER-READABLE MEDIUM FOR SWITCHING OPTICAL PATHS

BACKGROUND OF THE INVENTION

Field of the Invention

The present disclosure relates to a method, apparatus and computer-readable medium for switching optical paths, and more particularly to selectively redirecting light to different optical paths.

Description of Related Art

In fluorescence microscopes, there is a need to perform multi-channel imaging, wherein fluorophores emitting light with different wavelengths are sequentially imaged. In multi-channel imaging, a common method of separating the colors is to move different color filters into a light beam passing along an optical pathway. During rapid acquisition, the time required for exchanging filters is often the rate limiting step.

A prior device for moving different color filters into the optical pathway is a filter wheel having a plurality of filters mounted on a carousel, that can be rotated by a motor. The filters effectively select different spectral bands of the light from a light source or from an imaging port of a microscope.

While the filter wheel is conceptually simple, it suffers from several drawbacks. Implementations providing exchange frequencies at or above 30 Hz require that the rotating wheel be carefully balanced to minimize vibration. Changing the spectral bands can be cumbersome, as the changing requires multiple filters be specifically installed in the filter wheel to preserve the balance of the rotating system, or requiring that the whole filter wheel, consisting of the filters and the carousel, be changed.

In addition, the filter wheel is sometimes run at a fixed speed, so changing the effective exposure time of each filer is not possible. Also, the angular momentum of the rotating filter wheel prevents instantaneous stopping or shuttering, and also makes synchronization to an external clock, e.g., a video frame rate clock, difficult. The changes in angular momentum also require significant energy consumption by a driving motor. Finally, because the edge of each filter progressively moves across the width of the light beam as the filter wheel rotates, on-off transitions between the spectral bands are not abrupt, and the transitions include a fixed period of no illumination, the duration of which may not be optimum for all applications. This results in a reduction of the duty cycle and loss of efficiency in energy delivery.

Thus, a need exists for providing efficient optical path switching with improved switching times as well as reduced energy requirements.

SUMMARY OF THE INVENTION

In view of the foregoing, the present disclosure provides a method, apparatus, and computer-readable medium for switching optical paths.

A first exemplary embodiment of the present disclosure provides an apparatus. The apparatus includes a directing mirror for redirecting light from an incoming path to one of a plurality of input paths and redirecting the light from one of a plurality of output paths to an outgoing path, and a plurality of input mirrors, each one of the plurality of input mirrors operable for redirecting the light from a corresponding one of the plurality of input paths to a corresponding one of a plurality of transition paths. The apparatus further includes a plurality of output mirrors, each one of the plurality of output mirrors operable for redirecting the light from a corresponding one of the plurality of transition paths to one of the plurality of output paths, and a plurality of light modifying elements operable for modifying the light, each one of the plurality of light modifying elements located optically intermediate a corresponding one of the plurality of input mirrors and one of the plurality of output mirrors along one of the plurality of transition paths.

A second exemplary embodiment of the present disclosure provides a method including redirecting, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light. The method further includes redirecting, by the directing mirror, the light from one of the plurality of output paths to an outgoing path.

A third exemplary embodiment of the present disclosure provides a non-transitory computer-readable medium tangibly storing computer program instructions which, when executed by a processor, cause the processor to at least (i) redirect, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light, and (ii) redirect, by the directing mirror, the light from one of the plurality of output paths to an outgoing path.

A fourth exemplary embodiment of the present disclosure provides a method including redirecting, by a directing mirror, light from an incoming path to one of a plurality of input paths, and redirecting, by one of a plurality of input mirrors, the light from the one of the plurality of input paths to one of a plurality of transition paths. The method further includes modifying, by one of a plurality of light modifying elements, the light along the one of the plurality of transition paths, and redirecting, by one of a plurality of output mirrors, the light from the one of the plurality of transition paths to one of a plurality of output paths. The method further includes redirecting, by the directing mirror, the light from the one of the plurality of output paths to an outgoing path.

A fifth exemplary embodiment of the present disclosure provides a non-transitory computer-readable medium tangibly storing computer program instructions which, when executed by a processor, cause the processor to at least (i) redirect, by a directing mirror, light from an incoming path to one of a plurality of input paths, and (ii) redirect, by one of a plurality of input mirrors, the light from the one of the plurality of input paths to one of a plurality of transition paths; (iii) modify, by one of a plurality of light modifying elements, the light along the one of the plurality of transition paths, and (iv) redirect, by one of a plurality of output mirrors, the light from the one of the plurality of transition paths to one of a plurality of output paths, and (v) redirect, by the directing mirror, the light from the one of the plurality of output paths to an outgoing path.

A sixth exemplary embodiment of the present disclosure provides an apparatus including at least one processor, and at least one memory storing a computer program, in which the at least one memory with the computer program is configured with the at least one processor to cause the apparatus to at least (i) redirect, by a directing mirror, light from an incoming path to one of a plurality of input paths, and (ii) redirect, by one of a plurality of input mirrors, the light from the one of the plurality of input paths to one of a plurality of transition paths, and (iii) modify, by one of a plurality of light modifying elements, the light along the one of the plurality of transition paths, and (iv) redirect, by one of a plurality of output mirrors, the light from the one of the plurality of transition paths to one of a plurality of output paths, and (v) redirect, by the directing mirror, the light from the one of the plurality of output paths to an outgoing path.

The following will describe embodiments of the present disclosure, but it should be appreciated that the present disclosure is not limited to the described embodiments and various modifications of the present disclosure are possible without departing from the basic principles. The scope of the present disclosure is therefore to be determined solely by the appended claims.

BRIEF DESCRIPTION OF THE SEVERAL VIEWS OF THE DRAWING(S)

FIG. 6 presents a logic flow diagram in accordance with a method, apparatus and computer-readable medium for performing exemplary embodiments of the present disclosure.

DETAILED DESCRIPTION OF THE INVENTION

Exemplary embodiments of the present disclosure enable rapid light processing, such as wavelength selection, in image-forming light paths without undesired loss of spatial information. These embodiments provide selection of a light modifying element by directing light using a rotatable mirror to illuminate distinct optical components having fixed locations, while maintaining an exit location of processed light regardless of the selected distinct optical component. With these embodiments of the present disclosure, it is possible to apply different optical components to the light at rates an order of magnitude faster than physically moving optics of similar size into and out of an optical path. Embodiments of the present disclosure are particularly suitable for microscopic examination of fast processes, for example by extracting information such as spectral content out of an image produced by a research microscope commonly used in biological and chemical laboratories. For purposes of illustration, these embodiments are set forth in terms of a research microscope. However, it is understood embodiments of the present disclosure are applicable in any number of instances that require rapid light filtering and/or modification.

For the purposes of the present disclosure, the term light includes any type of electromagnetic radiation including, but not limited to gamma rays, x-rays, ultraviolet light, visible light, infrared light, microwaves, and radio waves. Typically, the light is configured as a light beam.

Figure 1A:
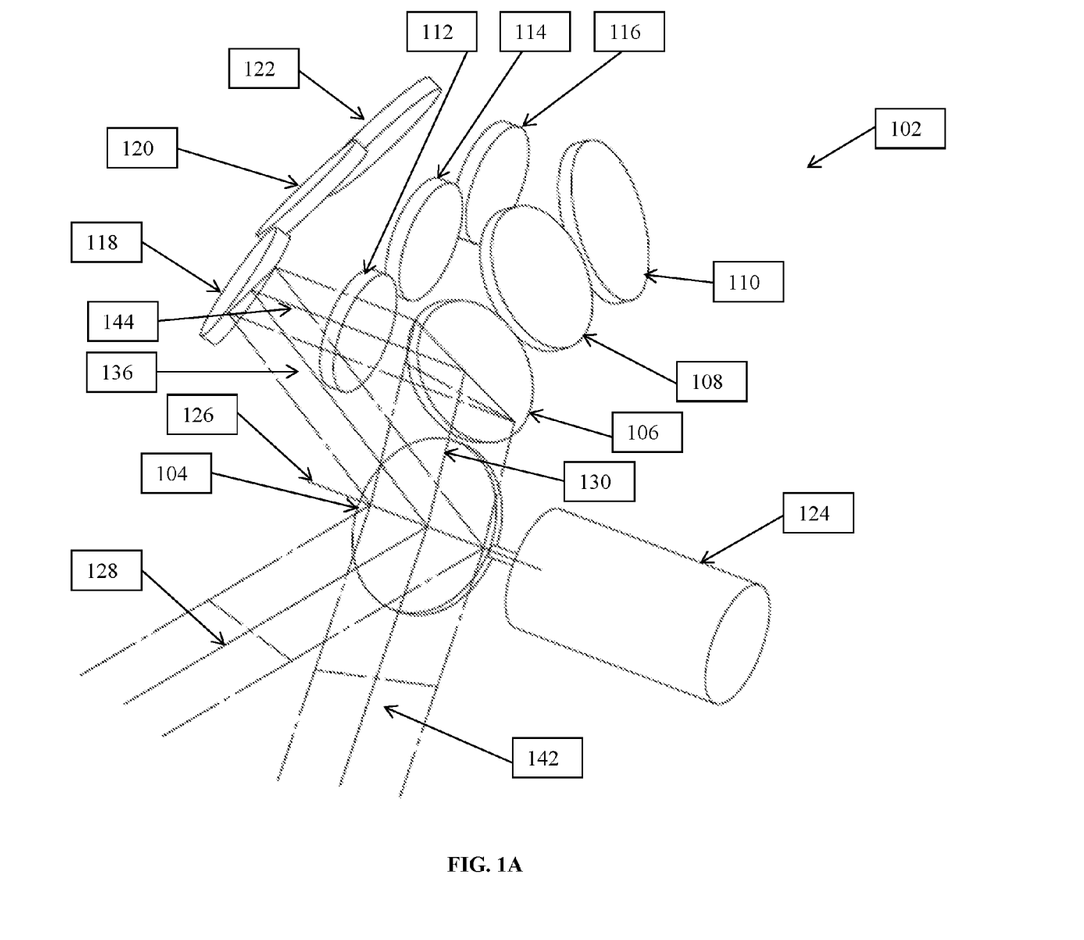
FIG. 1A presents a perspective view of an apparatus illustrating a first light path suitable for use in practicing exemplary embodiments of the present disclosure.

Referring to FIG. 1A, shown is a perspective view of an apparatus suitable for use in practicing exemplary embodiments of the present disclosure. Shown in FIG. 1A is apparatus 102 for receiving and directing light along a plurality of optical paths. Apparatus 102 includes directing mirror 104, input mirror 106, input mirror 108, input mirror 110, light modifying element 112, light modifying element 114, light modifying element 116, output mirror 118, output mirror 120, output mirror 122, and galvanometer 124. While apparatus 102 as shown in FIG. 1A includes three input mirrors (106, 108, 110), three light modifying elements (112, 114, 116), and three output mirrors (118, 120, 122), it should be understood that embodiments of the present disclosure include more or fewer input mirrors, light modifying elements, and output mirrors.

The light modifying elements 112, 114, and 116 can be any of a variety of elements such as optical filters, slits, apertures, transmissive or partially transmissive elements, lenses, tunable filters or any other elements that modify light such as, but not limited to, filtering by wave length, spatial modulation or polarization. An exemplary tunable filter includes tunable thin-film optical filters produced by Semrock.

For the purposes of this disclosure, the terms direct, directing, redirect, and redirecting include any alternate forms including any reflection of the light and may be substantially interchangeable. It should also be appreciated that embodiments of this disclosure contemplate the mirrors or light modifying elements being on-axis, wherein the term on-axis means that the optical axis of the light path or beam aligns with the mechanical or rotational axis of the mirror or light modifying element.

Directing mirror 104 is moveably affixed within apparatus 102 such that it can rotate about axis 126. Directing mirror 104 is able to receive incoming light from light path 128 and redirect the light from light path 128 along input light path 130 to input mirror 106, input light path 132 (shown in FIG. 1B) to input mirror 108, or input light path 134 (shown in FIG. 1C) to input mirror 110. In one embodiment, directing mirror 104 is selectively rotated about axis 126 such that directing mirror 104 can only redirect light along one of input light paths 130, 132, and 134. In another embodiment, directing mirror 104 can operably rotate about axis 126 such that it can be rotated to any angle location including input light paths 130, 132, and 134. Thus, embodiments of directing mirror 104 are able to redirect light towards particular portions of input mirrors. Embodiments of directing mirror 104 also include MEMs, MEM-mirrors, and semiconductor mirrors that are able to redirect light.

Directing mirror 104 is also operable such that directing mirror 104 can direct light along light paths 130, 132, and 134, and also simultaneously redirect light from output light path 136 from output mirror 118, light from output light path 138 (shown in FIG. 1B) from output mirror 120, or light from output light path 140 (shown in FIG. 1C) from output mirror 122 to outgoing light path 142. For instance, directing mirror 104 can reflect light received from incoming light path 128 to input mirror 106 along input light path 130. The light is then reflected by input mirror 106 through light modifying element 112 to output mirror 118. The light is then reflected again by output mirror 118 back along output light path 136 to directing mirror 104, which then reflects the light again, but towards outgoing light path 142. It should be noted that directing mirror 104 is not required to move or rotate, specifically; directing mirror 104 can remain stationary to reflect light from incoming light path 128 to an input mirror and also reflect light from an output mirror to outgoing light path 142.

Input mirror 106, input mirror 108, and input mirror 110 are fixedly attached in apparatus 102. However, it should be appreciated that embodiments of input mirrors 106, 108, and 110 allow for movement required to align input mirrors 106, 108, and 110 with the other elements of apparatus 102 for proper operation as described herein. Input mirror 106, input mirror 108, and input mirror 110 are located such that they are able to receive light from directing mirror 104 along input light paths 130, 132, and 134, respectively. In other words, input mirror 106 is fixedly located such that it can receive light from directing mirror 104 along input light path 130. Input mirror 108 is fixedly located such that it can receive light from directing mirror 104 along input light path 132 (shown in FIG. 1B). Input mirror 110 is fixedly located such that it can receive light from directing mirror 104 along input light path 134 (shown in FIG. 1C). Input mirror 106, input mirror 108, and input mirror 110 are also located such that light received from input light paths 130, 132, and 134, respectively, is redirected along transition paths 144, 146 (shown in FIG. 1B), and 148 (shown in FIG. 1C), respectively. In some embodiments, input mirrors 106, 108, and 110 are moveably attached to apparatus 102.

It should be understood that for embodiments of the present disclosure, light that is redirected by any of the mirrors herein includes light that is completely reflected such that the wavelength and frequency of the light is not altered. Embodiments of the present disclosure also include mirrors that partially direct or reflect light. Thus, the term mirror includes substantially completely reflective as well as partially or selectively reflective.

Light modifying element 112, light modifying element 114, and light modifying element 116 are fixedly attached to apparatus 102 along transition path 144, transition path 146 (shown in FIG. 1B), and transition path 148 (shown in FIG. 1C), respectively, to receive light from input mirror 106, input mirror 108, and input mirror 110, respectively. Embodiments of light modifying element 112, light modifying element 114, and light modifying element 116 are devices that can selectively transmit or allow the passage of light of different wavelengths and block the remaining wavelengths of light. Embodiments of light modifying elements 112, 114, and 116 also include devices that reflect, block or inhibit transmission of a portion of received light and transmit the remainder of the light. Embodiments of light modifying elements 112, 114, and 116 also include any type of light modifying elements that are able to modify light in any fashion. Embodiments of light modifying elements 112, 114, and 116 can also be moveably attached within apparatus 102 such that they can be removable, tilted, turned, rotated, or relocated.

In one embodiment, light modifying elements 112, 114, and 116 are moveably attached within apparatus 102 such that they can be selectively rotated (e.g., to a predetermined angle) thereby changing the angle of incidence that light contacts light modifying elements 112, 114, and 116 from input mirrors 106, 108, and 110, respectively.

Output mirror 118, output mirror 120, and output mirror 122 are fixedly attached in apparatus 102. However, it should be appreciated that embodiments of output mirrors 118, 120, and 122 allow for movement required to align output mirrors 118, 120, and 122 with the other elements of apparatus 102 for proper operation as described herein. Output mirror 118, output mirror 120, and output mirror 122 are located such that they are able to receive light from input mirror 106, input mirror 108, and input mirror 110, respectively, along transition paths 144, 146 (shown in FIG. 1B), and 148 (shown in FIG. 1C), respectively. In other words, output mirror 118 is fixedly located such that it can receive light from input mirror 106 and light modifying element 112 along transition path 144, and redirects light towards directing mirror 104. Output mirror 120 is fixedly located such that it can receive light from input mirror 108 and light modifying element 114 along transition path 146 (shown in FIG. 1B), and redirect light towards directing mirror 104. Output mirror 122 is fixedly located such that it can receive light from input mirror 110 and light modifying element 116 along transition path 148 (shown in FIG. 1C), and redirect light towards directing mirror 104. In some embodiments, output mirrors 118, 120, and 122 are moveably attached to apparatus 102.

Galvanometer 124 is an opto-electromechanical instrument that responds to an electrical stimulus by rotating a mirror (e.g., a directing mirror 104) and directing a light beam. Embodiments of galvanometer 124 are able to controllably direct light beams. It should be appreciated that embodiments of galvanometer 124 include any type of motor, stepper motor, actuator, or servo-motor that is operable to rotate a mirror (e.g., directing mirror 104) as described herein.

Galvanometer 124 is operably coupled to and controlled by controller 150 (not shown). Embodiments of controller 150 include a processor 152 (not shown) and memory 154 (not shown) including computer program instructions 156 (not shown). Embodiments of memory 154 with computer program instructions 156 when executed by processor 152 instruct galvanometer 124 to rotate directing mirror 104 in a manner desired by a user to direct light from incoming light path 128 to input mirror 106, 108, or 110, which then directs light through light modifying element 112, 114, or 116 to output mirror 118, 120, or 122, which then directs light back to directing mirror 104 and then to outgoing light path 142. In other embodiments, a user is able to manually rotate directing mirror 104 to select which path directing mirror 104 reflects light from incoming light path 128 to. Embodiments of apparatus 102 are able to rotate directing mirror 104 and thereby select the light propagation path very quickly, typically switching optical paths (or light paths) in time on the order of less than 20 milliseconds.

Figure 1B:
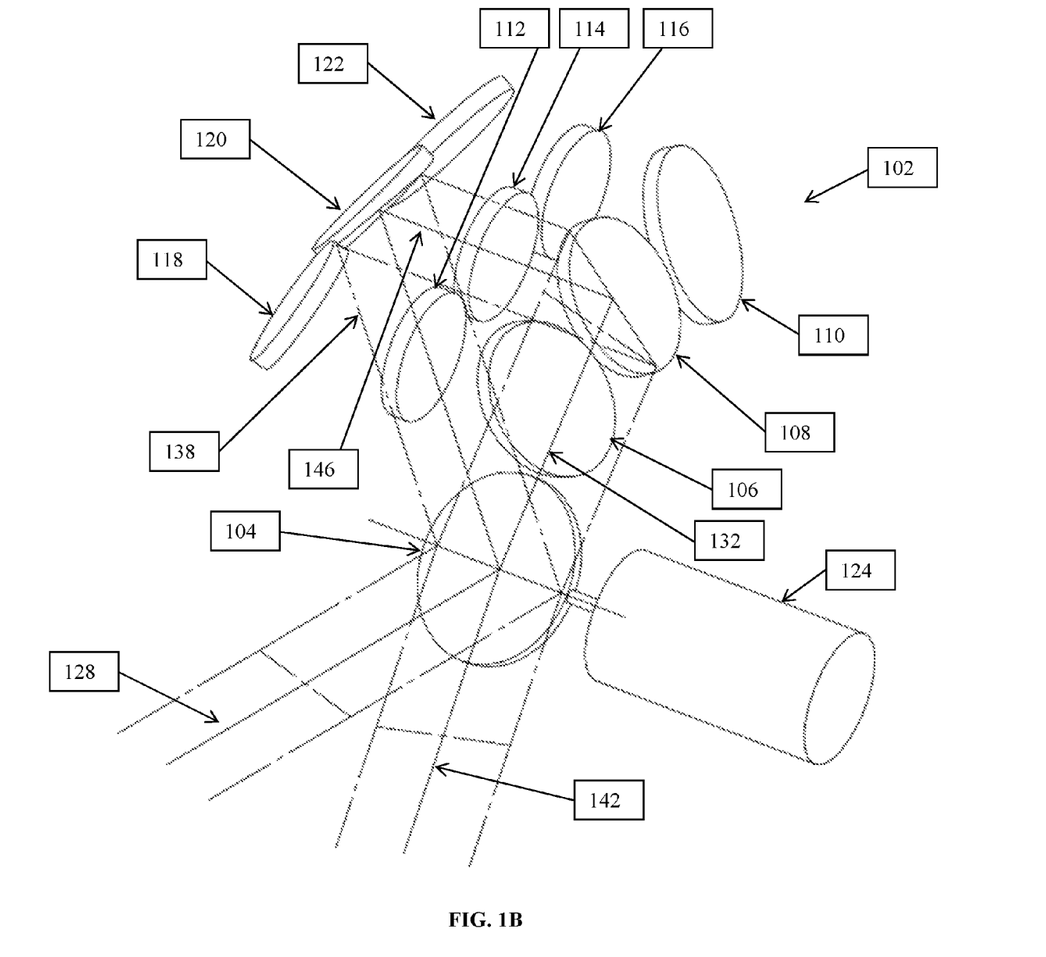
FIG. 1B presents a perspective view of the apparatus illustrating a second light path suitable for use in practicing exemplary embodiments of the present disclosure.
Figure 1C:
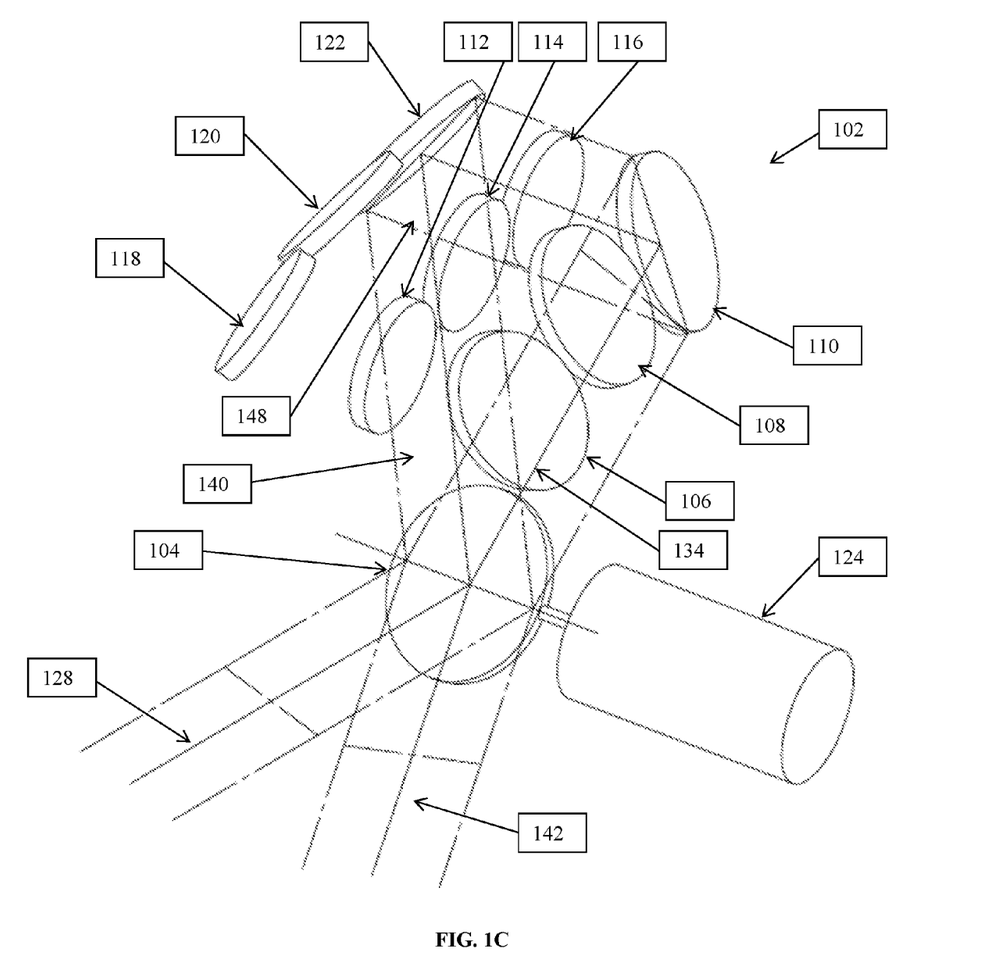
FIG. 1C presents a perspective view of the apparatus illustrating a third light path suitable for use in practicing exemplary embodiments of the present disclosure.

In the embodiment shown in FIG. 1A, light received by directing mirror 104 from incoming light path 128 and light received by directing mirror 104 from output mirrors 118, 120, and 122 overlaps on the surface of directing mirror 104. In other words, light that is received by directing mirror 104 from incoming light path 128 and from output mirrors 118, 120, and 122 are incident on the same location of directing mirror 104. It should also be appreciated that embodiments of directing mirror 104 as shown in FIG. 1A, FIG. 1B, and FIG. 1C include instances wherein the light redirected from incoming light path 128 and from output mirrors 118, 120, and 122 are partially coincident. Additionally, the light or path remains on axis at a given mirror or light modifying element independent of whether the light or paths are partially or fully coincident or separate.

In practice, directing mirror 104 receives light from incoming path 128 and redirects the light to one of input mirrors 106, 108, and 110. In some embodiments, directing mirror 104 may be able to rotate at a rate that allows light received over a given time period to be redirected by directing mirror 104 such that (i) light received during a first time segment of the given time period is redirected to input mirror 106, (ii) light received during a second time segment of the given time period is redirected to input mirror 108, and (iii) light received during a third time segment of the given time period is redirected to input mirror 110. It should be appreciated that embodiments of directing mirror 104 are able to rotate and redirect portions of light they receive to one or multiple input mirrors.

In one configuration, directing mirror 104 redirects the light along input light path 130 to input mirror 106, input mirror 106 will then redirect the light along transition path 144 to light modifying element 112 and output mirror 118. The light will pass through light modifying element 112, which for this example will filter out light other than light with wavelength between 600 nm and 700 nm. The light with wavelength between 600 nm and 700 nm will then be redirected by output mirror 118 back to directing mirror 104. The light redirected by directing mirror 104 from the incoming light path 128 will be coincident with the light redirected by directing mirror 104 from output mirror 118. Directing mirror 104 will then redirect the light received from output mirror 118 toward outgoing path 142.

Reference is now made to FIG. 1B, which depicts a perspective view of another light path of the apparatus 102 shown in FIG. 1A. Shown in FIG. 1B is apparatus 102, which includes directing mirror 104, input mirrors 106, 108, 110, light modifying elements 112, 114, 116, output mirrors 118, 120, 122, and galvanometer 124.

In the configuration shown in FIG. 1B, directing mirror 104 is positioned such that light received from incoming light path 128 is redirected by directing mirror 104 along input light path 132 toward input mirror 108. Input mirror 108 then redirects the light along transition path 146 toward light modifying element 114 and output mirror 120. The light is modified by light modifying element 114 and output mirror 120 redirects the light it receives toward directing mirror 104 along output light path 138. Directing mirror 104 then redirects the light again toward outgoing path 142. In the configuration shown in FIG. 1B, all of the light directing mirror 104 receives from incoming path 128 and from output light path 138 is coincident (or overlaps) on directing mirror 104.

Reference is now made to FIG. 1C, which depicts a perspective view of a third light path of the apparatus 102 shown in FIG. 1A. Shown in FIG. 1C is apparatus 102, which includes directing mirror 104, input mirrors 106, 108, 110, light modifying elements 112, 114, 116, output mirrors 118, 120, 122, and galvanometer 124.

In the configuration shown in FIG. 1C, directing mirror 104 is positioned such that light received from incoming light path 128 is redirected by directing mirror 104 along input light path 134 toward input mirror 110. Input mirror 110 then redirects the light along transition path 148 toward light modifying element 116 and output mirror 122. The light is modified by light modifying element 116 and output mirror 122 redirects the light it receives toward directing mirror 104 along output light path 140. Directing mirror 104 then redirects the light again toward outgoing path 142. In the configuration shown in FIG. 1C, all of the light directing mirror 104 receives from incoming path 128 and from output light path 140 is coincident (or overlaps) on directing mirror 104.

Figure 2:
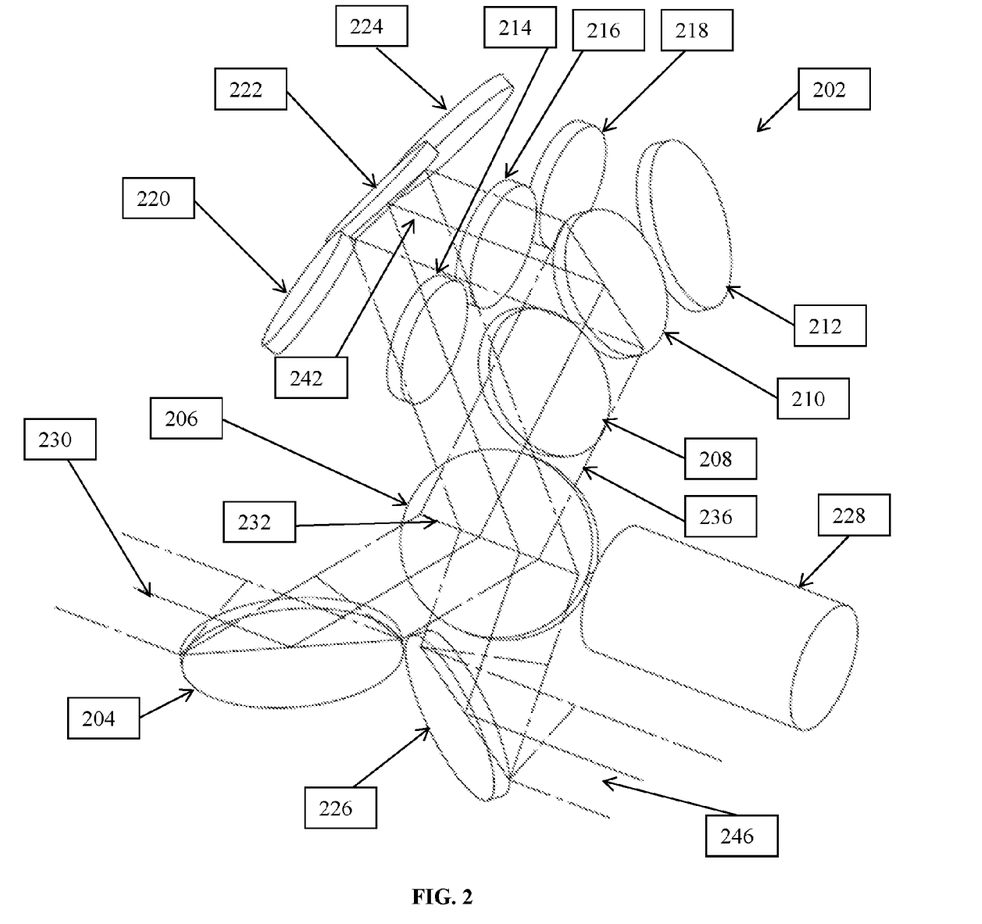
FIG. 2 presents a perspective view of a second apparatus suitable for use in practicing exemplary embodiments of the present disclosure.

Reference is now made to FIG. 2, which depicts a perspective view of a second apparatus suitable for use in practicing exemplary embodiments of the present disclosure. Shown in FIG. 2 is apparatus 202 for receiving and directing light. Apparatus 202 includes incoming mirror 204, directing mirror 206, input mirrors 208, 210, 212, light modifying elements 214, 216, 218, output mirrors 220, 222, 224, outgoing mirror 226, and galvanometer 228.

It should be appreciated that apparatus 202 can include fewer or more input mirrors, fewer or more light modifying elements and fewer or more output mirrors than depicted in FIG. 2.

Incoming mirror 204 is fixedly attached in apparatus 202 for receiving light from entry light path 230 and directing the light to directing mirror 206. Embodiments of incoming mirror 204 include incoming mirror 204 being moveably attached in apparatus 202.

Directing mirror 206 is moveably affixed within apparatus 202 to galvanometer 228 such that it can rotate about axis 232. Directing mirror 206 is able to receive light from incoming mirror 204 and redirect the light along light path 236 to input mirror 210 as illustrated in FIG. 2. Directing mirror 206 is operable to rotate about axis 232 to redirect light received from incoming mirror 204 along a plurality of different light paths to a plurality of different input mirrors.

Directing mirror 206 is also operable such that light received from any one of output mirrors 220, 222, 224 is redirected to outgoing mirror 226. Directing mirror 206 is operable such that it can rotate about axis 232 to reflect or redirect light along multiple light paths such as input light path 236 to input mirror 210, and also simultaneously redirect light from output mirror 222 to outgoing mirror 226.

Input mirrors 208, 210, 212 are fixedly located in apparatus 202 to receive light from directing mirror 206 along light paths 234 (not shown), 236, 238 (not shown), respectively, and to direct the light along transition paths 240 (not shown), 242, 244 (not shown), respectively, to light modifying elements 214, 216, 218, respectively, and output mirrors 220, 222, 224, respectively. Embodiments of input mirrors 208, 210, 212 include being moveably attached in apparatus 202.

Light modifying elements 214, 216, 218 are fixedly located in apparatus 202. Light modifying elements 214, 216, 218 are positioned to receive light from a corresponding input mirror. For instance, light modifying element 216 is positioned to receive light from input mirror 210 along transition path 242 between input mirror 210 and output mirror 222. Light modifying elements 214, 216, 218 include any type of light modifying element able to modify light in any manner. For instance, light modifying elements 214, 216, 218 include light modifying elements able to filter light by wavelength, spatial modulation, or polarization. Embodiments of light modifying elements 214, 216, 218 can also be moveably attached in apparatus 202 so that they can be removable, turned, tilted, rotated, or shifted in apparatus 202.

Light received by directing mirror 206, as shown in FIG. 2, from incoming mirror 204 is incident on a first portion of directing mirror 206, and light from output mirrors 220, 222, 224 is incident on a second portion of directing mirror 206. As shown in FIG. 2, the first portion and the second portion partially overlap. In other words, some of the light that directing mirror 206 receives from incoming mirror 204 is partially incident on the same area of directing mirror 206 as light received from output mirrors 220, 222, 224. Embodiments of directing mirror 206 provide that 50% of the light received from incoming mirror 204 is coincident with 50% of the light received from output mirrors 220, 222, 224. In other embodiments, 75% of light received by incoming mirror 204 is coincident with 75% of the light received from output mirrors 220, 222, 224. It should be appreciated that embodiments of directing mirror 206 include any arrangement wherein a portion of the light received from incoming mirror 204 and the light received from output mirrors 220, 222, 224 is partially coincident whether it be 1% coincident or 99% (or 100%) coincident on directing mirror 206.

It should also be appreciated that embodiments of apparatus 202 do not require an incoming mirror 204 or an outgoing mirror 226. Embodiments of apparatus 202 provide that directing mirror 206 can receive light directly from an entry light path and direct light directly towards an exit light path 246.

Figure 3:
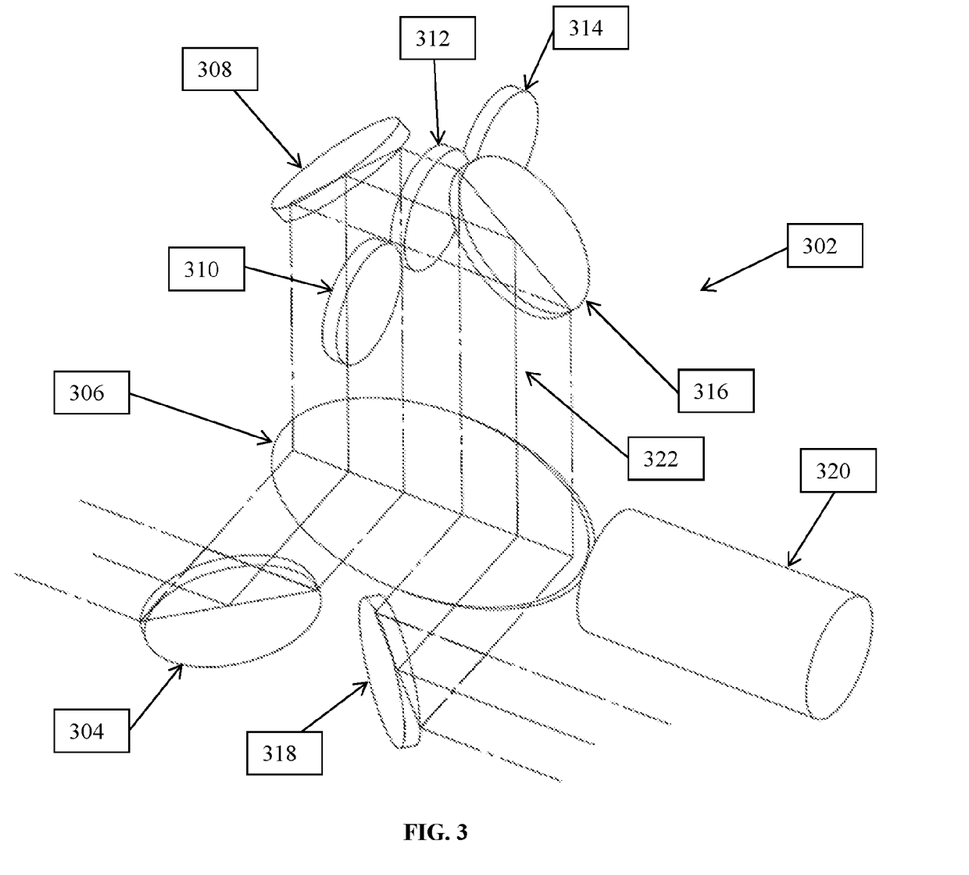
FIG. 3 presents a perspective view of a third apparatus suitable for use in practicing exemplary embodiments of the present disclosure.

Reference is now made to FIG. 3, which depicts a perspective view of a third apparatus suitable for use in practicing exemplary embodiments of the present disclosure. Shown in FIG. 3 is apparatus 302. Apparatus 302 includes incoming mirror 304, directing mirror 306, input mirror 308, light modifying elements 310, 312, 314, output mirror 316, outgoing mirror 318, and galvanometer 320.

As depicted in FIG. 3, directing mirror 306 receives light from incoming mirror 304 on a first portion of directing mirror 306, and also receives light from output mirror 316 along output light path 322 on a second portion of directing mirror 306. The first portion of directing mirror 306 and the second portion of directing mirror 306 being separate and distinct parts of directing mirror 306. In other words, none of the light received from incoming mirror 304 by directing mirror 306 overlaps or is coincident with light received from output mirror 316 by directing mirror 306. Directing mirror 306 can also include two separate mirrors.

It should be appreciated, that apparatus 302 can include multiple input mirrors and multiple output mirrors each along corresponding different light paths even though only input mirror 308 and output mirror 316 are depicted in FIG. 3. Embodiments of apparatus 302 provide that it can contain a plurality of input mirrors to receive light along a plurality of input paths from directing mirror 306, and a plurality of output mirrors to direct light towards directing mirror 306 along a plurality of output paths.

Embodiments of directing mirror 306 provide that it can simultaneously (i) direct light received from incoming mirror 304 toward one of a plurality of different input mirrors along one of a plurality of correspondingly different light paths, and also (ii) direct light received from one of a plurality of output mirrors from one of a plurality of correspondingly different light paths towards outgoing mirror 318.

Figure 4:
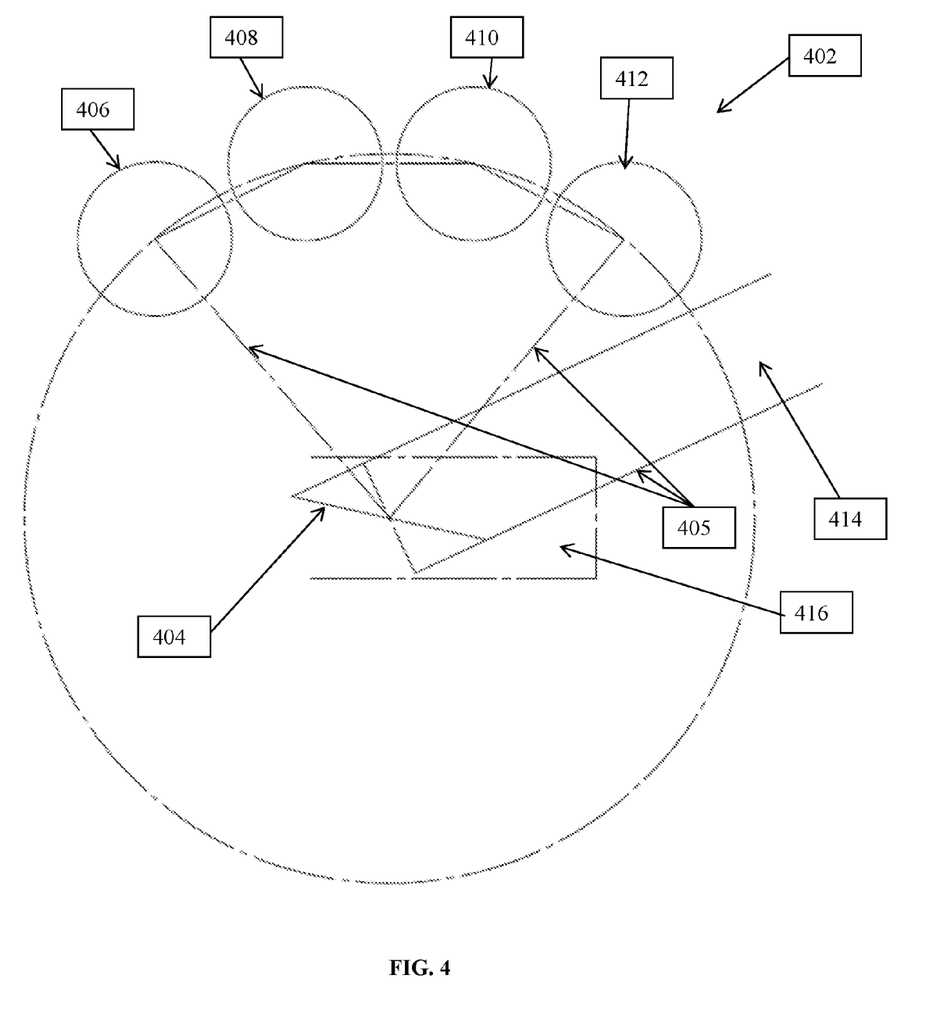
FIG. 4 presents a side view of an apparatus suitable for use in practicing exemplary embodiments of the present disclosure.

Reference is now made to FIG. 4, which illustrates a side view of an apparatus suitable for use in practicing exemplary embodiments of the present disclosure. Shown in FIG. 4 is apparatus 402, which includes directing mirror 404, input mirrors 406, 408, 410, and 412, incoming light path 414, and outgoing light path 416.

As shown in FIG. 4, directing mirror 404 is able to receive light 405 from incoming light path 414 and redirect the light 405 by rotating to different positions that align with input mirrors 406, 408, 410, or 412. In some embodiments of apparatus 402, incoming light path 414 and outgoing light path 416 act as either an incoming light path or an outgoing light path. For instance, directing mirror 404 can (i) direct incoming light 405 from outgoing light path 416 to an input mirror, and (ii) direct light 405 from an output mirror to exit apparatus 402 through incoming light path 414. Although not visible from the perspective in FIG. 4, apparatus 402 also includes at least four light modifying elements each of which align with light 405 directed by one of the input mirrors 406, 408, 410, or 412, and at least four output mirrors each of which are positioned to receive light 405 from one of the input mirrors 406, 408, 410, and 412 and to direct the light 405 to directing mirror 404. In the embodiment shown in FIG. 4, directing mirror 404 may include the embodiments wherein the light 405 it receives from incoming light path 414 and the light 405 it receives from the output mirrors overlaps, partially overlaps, or does not overlap at all.

It should be appreciated that the lines indicating light paths in FIGS. 1A-4 merely illustrate a possible path for light to take through exemplary embodiments of the present disclosure. The lines indicating light paths in FIGS. 1A-4 do not represent a physical element of the apparatus being described.

Figure 5:
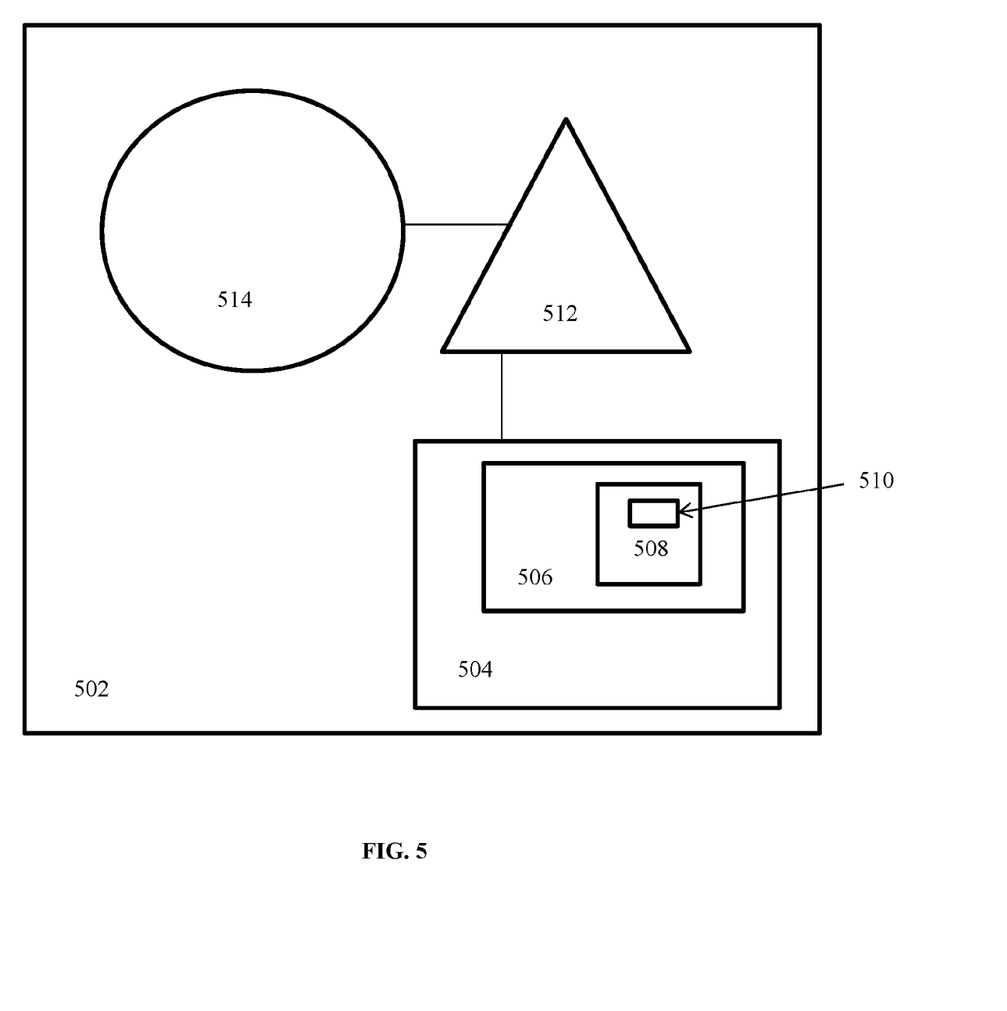
FIG. 5 presents a block diagram of an apparatus suitable for use in practicing exemplary embodiments of the present disclosure.

Reference is now made to FIG. 5, which illustrates a simplified block diagram of an apparatus suitable for use in practicing exemplary embodiments of the present disclosure. In FIG. 5, apparatus 502 is adapted for receiving and/or redirecting light.

Apparatus 502 includes processing means such as controller 504, which includes data processor 506, storing means such as computer-readable memory 508 storing computer program 510. Apparatus 502 further includes optical apparatus 514 for receiving and/or redirecting light. Apparatus 502 also includes galvanometer 512 for rotating directing mirror of optical apparatus 514. Galvanometer 512 is controlled by and operably coupled to controller 504. Controller 504, data processor 506, and computer-readable memory 508 with computer program 510 may provide a mechanism to operate galvanometer 512, which is able to rotate and operate optical apparatus 514 for receiving and/or redirecting light.

Embodiments of optical apparatus 514 are shown and described more fully with regards to FIGS. 1A-4. Embodiments of optical apparatus 514 include a directing mirror that can rotate about an axis such that it can redirect light in predetermined directions to a plurality of input mirrors, a plurality of light modifying elements, and a plurality of output mirrors.

Computer program 510 in apparatus 502 in exemplary embodiments is a set of computer program instructions that, when executed by data processor 506, enable apparatus 502 to operate in accordance with exemplary embodiments of the present disclosure, as detailed above. In these regards, the exemplary embodiments of the present disclosure may be implemented at least in part by a computer software stored in computer-readable memory 508, which is executable by data processor 506. An apparatus implementing these aspects of the present disclosure need not be the entire apparatus as depicted in FIG. 5 or may be one or more components of same, such as the above described tangibly stored software, hardware, and data processor.

Referring to FIG. 6, presented is an exemplary logic flow diagram in accordance with a method, apparatus, and computer-readable medium for performing exemplary embodiments of the present disclosure. Block 602 presents (a) redirecting, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light; and (b) redirecting, by the directing mirror, the light from one of the plurality of output paths to an outgoing path. Then block 604 specifies wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

Some of the non-limiting implementations detailed above are also summarized at FIG. 6 as depicted below block 604. Block 606 relates to wherein the plurality of input mirrors, the plurality of light modifying elements, and the plurality of output mirrors are fixed relative to each other. Block 608 then further specifies wherein the plurality of input mirrors, the plurality of light modifying elements, and the plurality of output mirrors are moveably affixed relative to each other. Block 610 specifies wherein the light redirected by the directing mirror from the incoming path to the one of the plurality of input paths is coincident with the light redirected by the directing mirror from the one of the plurality of output paths to the outgoing path. Block 612 states wherein the light redirected by the directing mirror from the incoming path to the one of the plurality of input paths is partially coincident with the light redirected by the directing mirror from the one of the plurality of output paths to the outgoing path.

Next block 614 relates to wherein the light redirected by the directing mirror from the incoming path to the one of the plurality of input paths is spaced from the light redirected by the directing mirror from the one of the plurality of output paths to the outgoing path. Finally, block 616 states wherein the plurality of light modifying elements are at least one of an optical filter, lens, polarization filter, spatial filter, aperture, slot, and color filter.

Figure 7:
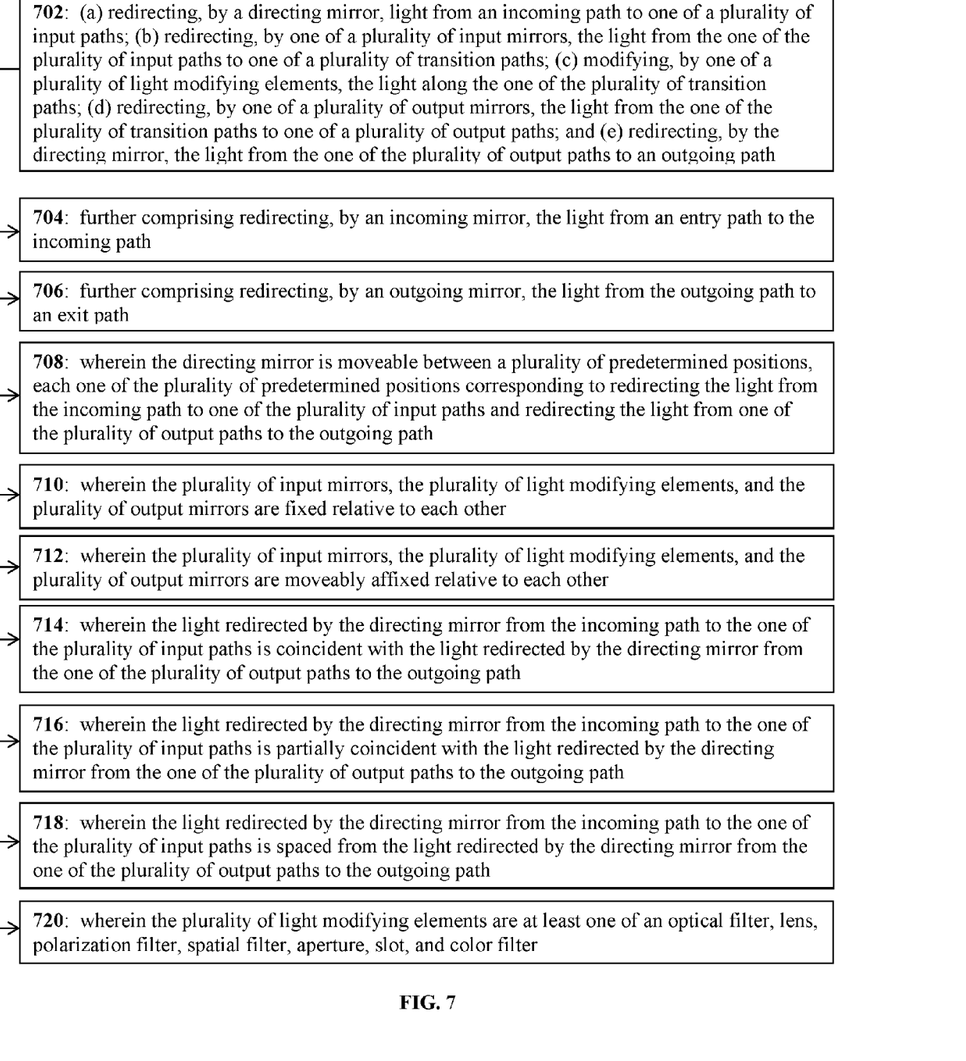
FIG. 7 presents another logic flow diagram in accordance with a method, apparatus and computer-readable medium for performing exemplary embodiments of the present disclosure.

Reference is now made to FIG. 7, which depicts another exemplary logic flow diagram in accordance with a method, apparatus, and computer-readable medium for performing exemplary embodiments of the present disclosure. Block 702 relates to (a) redirecting, by a directing mirror, light from an incoming path to one of a plurality of input paths; (b) redirecting, by one of a plurality of input mirrors, the light from the one of the plurality of input paths to one of a plurality of transition paths; (c) modifying, by one of a plurality of light modifying elements, the light along the one of the plurality of transition paths; (d) redirecting, by one of a plurality of output mirrors, the light from the one of the plurality of transition paths to one of a plurality of output paths; and (e) redirecting, by the directing mirror, the light from the one of the plurality of output paths to an outgoing path. Block 704 specifies further comprising redirecting, by an incoming mirror, the light from an entry path to the incoming path.

Next block 706 indicates further comprising redirecting, by an outgoing mirror, the light from the outgoing path to an exit path. Block 708 then states wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path. Block 710 then relates to wherein the plurality of input mirrors, the plurality of light modifying elements, and the plurality of output mirrors are fixed relative to each other.

Block 712 next indicates wherein the plurality of input mirrors, the plurality of light modifying elements, and the plurality of output mirrors are moveably affixed relative to each other. Block 714 states wherein the light redirected by the directing mirror from the incoming path to the one of the plurality of input paths is coincident with the light redirected by the directing mirror from the one of the plurality of output paths to the outgoing path. Block 716 provides to wherein the light redirected by the directing mirror from the incoming path to the one of the plurality of input paths is partially coincident with the light redirected by the directing mirror from the one of the plurality of output paths to the outgoing path.

Block 718 states wherein the light redirected by the directing mirror from the incoming path to the one of the plurality of input paths is spaced from the light redirected by the directing mirror from the one of the plurality of output paths to the outgoing path. Block 720 indicates wherein the plurality of light modifying elements are at least one of an optical filter, lens, polarization filter, spatial filter, aperture, slot, and color filter.

The logic diagrams of FIG. 6 and FIG. 7 may be considered to illustrate the operation of a method, a result of execution of computer program instructions stored in a computer-readable medium. The logic diagrams of FIG. 6 and FIG. 7 may also be considered a specific manner in which components of the apparatus are configured to cause that apparatus to operate, whether such apparatus is an optical device, a telescope, an optical imaging instrument, an optical communication device, a laboratory automation instrument, a life science analysis instrument, a biomedical analysis instrument, a metallurgical analysis instrument, an electronic device, a computer, a microscope, a laptop, tablet, desktop, or one or more components thereof. The various blocks shown in FIG. 6 and FIG. 7 may also be considered as a plurality of coupled circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors, reconfigurable logic devices, digital signal processors and multi-core processors.

By fixing input mirrors, light modifying elements and output mirrors, the present disclosure reduces, as compared to filter wheels, the amount of mass that must be moved to switch optical paths. In one application, the present system is employed in fluorescence microscopes forming multi-channel imagery. In one configuration, switching between different light modifying elements is on the order of less than 10 milliseconds and in select configurations, approximately 5 milliseconds, and depending upon component size, between 1 millisecond and 3 milliseconds.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative and non-restrictive. Furthermore, equivalents and modifications not described above may also be employed without departing from the scope of the present disclosure, which is defined in the accompanying claims.

The following presents some further exemplary embodiments of the present disclosure:

Embodiment 1

A method comprising: (a) redirecting, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light; and (b) redirecting, by the directing mirror, the light from one of the plurality of output paths to an outgoing path.

Embodiment 2

The method according to Embodiment 1, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

Embodiment 3

The method according to Embodiment 1, wherein the plurality of input mirrors, the plurality of light modifying elements, and the plurality of output mirrors are fixed relative to each other.

Embodiment 4

The method according to Embodiment 1, wherein the plurality of input mirrors, the plurality of light modifying elements, and the plurality of output mirrors are moveably affixed relative to each other.

Embodiment 5

The method according to Embodiment 1, wherein the light redirected by the directing mirror from the incoming path to the one of the plurality of input paths is coincident with the light redirected by the directing mirror from the one of the plurality of output paths to the outgoing path.

Embodiment 6

The method according to Embodiment 1, wherein the light redirected by the directing mirror from the incoming path to the one of the plurality of input paths is partially coincident with the light redirected by the directing mirror from the one of the plurality of output paths to the outgoing path.

Embodiment 7

The method according to Embodiment 1, wherein the light redirected by the directing mirror from the incoming path to the one of the plurality of input paths is spaced from the light redirected by the directing mirror from the one of the plurality of output paths to the outgoing path.

Embodiment 8

The method according to Embodiment 1, wherein the plurality of light modifying elements are at least one of an optical filter, lens, polarization filter, spatial filter, aperture, slot, and color filter.

Embodiment 9

A non-transitory computer-readable medium tangibly storing computer program instructions which when executed by a processor, cause the processor to at least: (a) redirect, by a directing mirror, light from an incoming path to one of a plurality of input paths; (b) redirect, by one of a plurality of input mirrors, the light from the one of the plurality of input paths to one of a plurality of transition paths; (c) modify, by one of a plurality of light modifying elements, the light along the one of the plurality of transition paths; (d) redirect, by one of a plurality of output mirrors, the light from the one of the plurality of transition paths to one of a plurality of output paths; and (e) redirect, by the directing mirror, the light from the one of the plurality of output paths to an outgoing path.

Embodiment 10

The non-transitory computer-readable medium according to Embodiment 9, the computer-readable medium storing computer program instructions further causing the processor to redirect, by an incoming mirror, the light from an entry path to the incoming path.

Embodiment 11

The non-transitory computer-readable medium according to Embodiment 9, the computer-readable medium storing computer program instructions further causing the processor to redirect, by an outgoing mirror the light from the outgoing path to an exit path.

Embodiment 12

The non-transitory computer-readable medium according to Embodiment 9, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

Embodiment 13

The non-transitory computer-readable medium according to Embodiment 9, wherein the plurality of input mirrors, the plurality of light modifying elements, and the plurality of output mirrors are fixed relative to each other.

Embodiment 14

The non-transitory computer-readable medium according to Embodiment 9, wherein the plurality of input mirrors, the plurality of light modifying elements, and the plurality of output mirrors are moveably affixed relative to each other.

Embodiment 15

The non-transitory computer-readable medium according to Embodiment 9, wherein the light redirected by the directing mirror from the incoming path to the one of the plurality of input paths is coincident with the light redirected by the directing mirror from the one of the plurality of output paths to the outgoing path.

Embodiment 16

The non-transitory computer-readable medium according to Embodiment 9, wherein the light redirected by the directing mirror from the incoming path to the one of the plurality of input paths is partially coincident with the light redirected by the directing mirror from the one of the plurality of output paths to the outgoing path.

Embodiment 17

The non-transitory computer-readable medium according to Embodiment 9, wherein the light redirected by the directing mirror from the incoming path to the one of the plurality of input paths is spaced from the light redirected by the directing mirror from the one of the plurality of output paths to the outgoing path.

Embodiment 18

The non-transitory computer-readable medium according to Embodiment 9, wherein the plurality of light modifying elements are at least one of an optical filter, lens, polarization filter, spatial filter, aperture, slot, and color filter.

Embodiment 19

An apparatus, comprising: at least one processor, and at least one memory storing a computer program; in which the at least one memory with the computer program is configured with the at least one processor to cause the apparatus to at least: (a) redirect, by a directing mirror, light from an incoming path to one of a plurality of input paths; (b) redirect, by one of a plurality of input mirrors, the light from the one of the plurality of input paths to one of a plurality of transition paths; (c) modify, by one of a plurality of light modifying elements, the light along the one of the plurality of transition paths; (d) redirect, by one of a plurality of output mirrors, the light from the one of the plurality of transition paths to one of a plurality of output paths; and (e) redirect, by the directing mirror, the light from the one of the plurality of output paths to an outgoing path.

Embodiment 20

The apparatus according to Embodiment 19, the at least one processor and the at least one memory storing a computer program further cause the apparatus to redirect, by an incoming mirror, the light from an entry path to the incoming path.

Embodiment 21

The apparatus according to Embodiment 19, the at least one processor and the at least one memory storing a computer program further cause the apparatus to redirect, by an outgoing mirror the light from the outgoing path to an exit path.

Embodiment 22

The apparatus according to Embodiment 19, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

Embodiment 23

The apparatus according to Embodiment 19, wherein the plurality of input mirrors, the plurality of light modifying elements, and the plurality of output mirrors are fixed relative to each other.

Embodiment 24

The apparatus according to Embodiment 19, wherein the plurality of input mirrors, the plurality of light modifying elements, and the plurality of output mirrors are moveably affixed relative to each other.

Embodiment 25

The apparatus according to Embodiment 19, wherein the light redirected by the directing mirror from the incoming path to the one of the plurality of input paths is coincident with the light redirected by the directing mirror from the one of the plurality of output paths to the outgoing path.

Embodiment 26

The apparatus according to Embodiment 19, wherein the light redirected by the directing mirror from the incoming path to the one of the plurality of input paths is partially coincident with the light redirected by the directing mirror from the one of the plurality of output paths to the outgoing path.

Embodiment 27

The apparatus according to Embodiment 19, wherein the light redirected by the directing mirror from the incoming path to the one of the plurality of input paths is spaced from the light redirected by the directing mirror from the one of the plurality of output paths to the outgoing path.

Embodiment 28

The apparatus according to Embodiment 19, wherein the plurality of light modifying elements are at least one of an optical filter, lens, polarization filter, spatial filter, aperture, slot, and color filter.

The invention claimed is:

1. An apparatus comprising:
    (a) a directing mirror operable for redirecting light from an incoming path to one of a plurality of input paths, the directing mirror operable for redirecting the light from one of a plurality of output paths to an outgoing path, wherein the incoming path is adjacent to the outgoing path;
    (b) a plurality of input mirrors, each one of the plurality of input mirrors operable for redirecting the light from one of the plurality of input paths to one of a plurality of transition paths;
    (c) a plurality of output mirrors, each one of the plurality of output mirrors operable for redirecting the light from one of the plurality of transition paths to one of the plurality of output paths; and
    (d) a plurality of light modifying elements operable for modifying the light, each one of the plurality of light modifying elements located optically intermediate one of the plurality of input mirrors and one of the plurality of output mirrors along one of the plurality of transition paths, wherein the directing mirror is operable to simultaneously redirect both (i) the light from the incoming path to the one of a plurality of input paths and (ii) the light from the one of a plurality of output paths to the outgoing path.

2. The apparatus according to claim 1, the apparatus further comprising an incoming mirror for redirecting the light from an entry path to the incoming path.

3. The apparatus according to claim 1, the apparatus further comprising an outgoing mirror for redirecting the light from the outgoing path to an exit path.

4. The apparatus according to claim 1, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

5. The apparatus according to claim 1, wherein the plurality of input mirrors, the plurality of light modifying elements, and the plurality of output mirrors are moveably affixed relative to each other.

6. The apparatus according to claim 1, wherein the plurality of input mirrors, the plurality of light modifying elements, and the plurality of output mirrors are fixed relative to each other.

7. The apparatus according to claim 1, wherein the light redirected by the directing mirror from the incoming path to the one of the plurality of input paths is coincident with the light redirected by the directing mirror from the one of the plurality of output paths to the outgoing path.

8. The apparatus according to claim 1, wherein the light redirected by the directing mirror from the incoming path to the one of the plurality of input paths is partially coincident with the light redirected by the directing mirror from the one of the plurality of output paths to the outgoing path.

9. The apparatus according to claim 1, wherein the light redirected by the directing mirror from the incoming path to the one of the plurality of input paths is spaced from the light redirected by the directing mirror from the one of the plurality of output paths to the outgoing path.

10. The apparatus according to claim 1, wherein the plurality of light modifying elements are at least one of an optical filter, lens, polarization filter, spatial filter, aperture, slit, and color filter.

11. A non-transitory computer-readable medium tangibly storing computer program instructions which when executed by a processor, cause the processor to at least:
    (a) redirect, by a directing mirror, light from an incoming path to one of a plurality of input paths, each one of the plurality of input paths including one of a plurality of input mirrors operable for redirecting the light along one of a plurality of transition paths to one of a plurality of output mirrors, each one of the plurality of output mirrors operable for redirecting the light from one of the plurality of transition paths to the directing mirror along one of a plurality of output paths, each one of the plurality of transition paths including one of a plurality of light modifying elements operable for modifying the light; and
    (b) redirect, by the directing mirror, the light from one of the plurality of output paths to an outgoing path, wherein the directing mirror is operable to simultaneously redirect both (i) the light from the incoming path to the one of a plurality of input paths and (ii) the light from the one of a plurality of output paths to the outgoing path, and wherein the incoming path and the outgoing path is acute.

12. The non-transitory computer-readable medium according to claim 11, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

13. The non-transitory computer-readable medium according to claim 11, wherein the plurality of input mirrors, the plurality of light modifying elements, and the plurality of output mirrors are moveably affixed relative to each other.

14. The non-transitory computer-readable medium according to claim 11, wherein the plurality of input mirrors, the plurality of light modifying elements, and the plurality of output mirrors are fixed relative to each other.

15. The non-transitory computer-readable medium according to claim 11, wherein the light redirected by the directing mirror from the incoming path to the one of the plurality of input paths is coincident with the light redirected by the directing mirror from the one of the plurality of output paths to the outgoing path.

16. The non-transitory computer-readable medium according to claim 11, wherein the light redirected by the directing mirror from the incoming path to the one of the plurality of input paths is partially coincident with the light redirected by the directing mirror from the one of the plurality of output paths to the outgoing path.

17. The non-transitory computer-readable medium according to claim 11, wherein the light redirected by the directing mirror from the incoming path to the one of the plurality of input paths is spaced from the light redirected by the directing mirror from the one of the plurality of output paths to the outgoing path.

18. The non-transitory computer-readable medium according to claim 11, wherein the plurality of light modifying elements are at least one of an optical filter, lens, polarization filter, spatial filter, aperture, slit, and color filter.

19. A method comprising:
(a) redirecting, by a directing mirror, light from an incoming path to one of a plurality of input paths;
(b) redirecting, by one of a plurality of input mirrors, the light from the one of the plurality of input paths to one of a plurality of transition paths;
(c) modifying, by one of a plurality of light modifying elements, the light along the one of the plurality of transition paths;
(d) redirecting, by one of a plurality of output mirrors, the light from the one of the plurality of transition paths to one of a plurality of output paths; and
(e) redirecting, by the directing mirror, the light from the one of the plurality of output paths to an outgoing path, wherein the directing mirror is operable to simultaneously redirect both (i) the light from the incoming path to the one of a plurality of input paths and (ii) the light from the one of a plurality of output paths to the outgoing path, and wherein the incoming path is adjacent to the outgoing path.

20. The method according to claim 19, the method further comprising redirecting, by an incoming mirror, the light from an entry path to the incoming path.

21. The method according to claim 19, the method further comprising redirecting, by an outgoing mirror, the light from the outgoing path to an exit path.

22. The method according to claim 19, wherein the directing mirror is moveable between a plurality of predetermined positions, each one of the plurality of predetermined positions corresponding to redirecting the light from the incoming path to one of the plurality of input paths and redirecting the light from one of the plurality of output paths to the outgoing path.

23. The method according to claim 19, wherein the plurality of input mirrors, the plurality of light modifying elements, and the plurality of output mirrors are fixed relative to each other.

24. The method according to claim 19, wherein the plurality of input mirrors, the plurality of light modifying elements, and the plurality of output mirrors are moveably affixed relative to each other.

25. The method according to claim 19, wherein the light redirected by the directing mirror from the incoming path to the one of the plurality of input paths is coincident with the light redirected by the directing mirror from the one of the plurality of output paths to the outgoing path.

26. The method according to claim 19, wherein the light redirected by the directing mirror from the incoming path to the one of the plurality of input paths is partially coincident with the light redirected by the directing mirror from the one of the plurality of output paths to the outgoing path.

27. The method according to claim 19, wherein the light redirected by the directing mirror from the incoming path to the one of the plurality of input paths is spaced from the light redirected by the directing mirror from the one of the plurality of output paths to the outgoing path.

28. The method according to claim 19, wherein the plurality of light modifying elements are at least one of an optical filter, lens, polarization filter, spatial filter, aperture, slit, and color filter.

* * * * *